(No Model.)

E. KEMPSHALL.
HOSE MENDER.

No. 512,252.  Patented Jan. 2, 1894.

Witnesses:
Henry L. Reckard
H. R. Brownell

Inventor:
Eleazer Kempshall
By his Attorney,
R. C. Mitchell

THE NATIONAL LITHOGRAPHING COMPANY,
WASHINGTON, D. C.

UNITED STATES PATENT OFFICE.

ELEAZER KEMPSHALL, OF BROOKLYN, NEW YORK, ASSIGNOR TO EDWIN M. MILLARD, OF SAME PLACE.

HOSE-MENDER.

SPECIFICATION forming part of Letters Patent No. 512,252, dated January 2, 1894.

Application filed January 5, 1893. Serial No. 457,396. (No model.)

*To all whom it may concern:*

Be it known that I, ELEAZER KEMPSHALL, of the city of Brooklyn, county of Kings, and State of New York, have invented new and useful Improvements in Hose-Mending Devices, of which the following is a specification.

My invention relates to improvements in hose mending devices as hereinafter fully shown and described.

The object of my invention is to construct a mechanical means whereby a break in a hose may be quickly and easily mended or whereby the ends of two pieces of hose may be connected together to form a permanent water tight joint.

My invention is illustrated by the accompanying drawings, in which—

Figure 1:
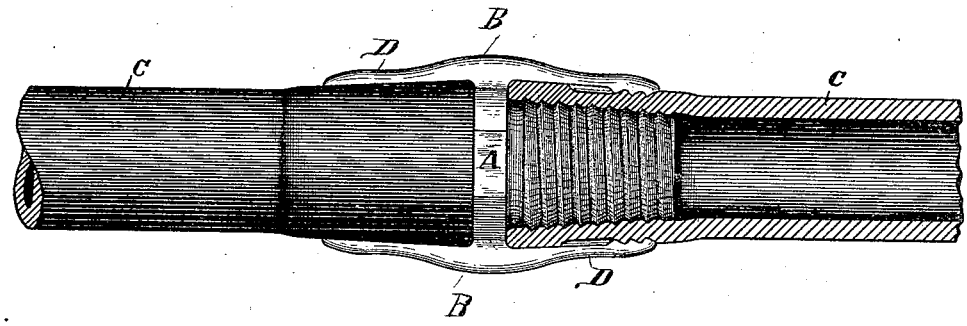
Figure 2:
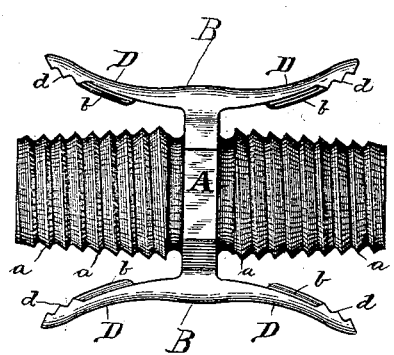

Figure 1. is a side elevation of my invention as it appears when in use, one end of the hose pipe being shown in section. Fig. 2. is a side elevation of the hose mender, and Fig. 3. is an end elevation of Fig. 2.

Figure 3:
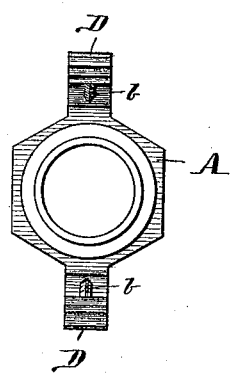

A is a hollow cylindrical body or shank, which preferably tapers slightly from the center toward the ends. On this taper are cut screw threads $a\ a$ by preference. B B are projections formed preferably about midway in the shank A. These projections B B serve to carry the overhanging arms D D which run lengthwise with the shank A. On the inner surface of these arms D D is formed by preference the raised beads $b\ b$, which run longitudinally with the said arms, for the purpose hereinafter described. Transverse ridges or beads $d\ d$ may be formed if desired on the same surface. Before the device is in operation it is desirable that the arms D D flare slightly outward, as shown in Figs. 2 and 3, to facilitate the adjustment of the mender to the parts to be mended. Various sizes of these mending devices may be made so that they may be adapted to any size of hose. The bore of the cylindrical shank A is preferably about the same as the inside diameter of the hose $c$ $c$ with which it is to be used. The outside diameter is therefore slightly larger. In operation the leak in the hose is found and the weak or defective portion cut out. The ends of the hose $c\ c$ remaining are by preference cut square off. One end is slipped over, or screwed on to, one end of the shank A. The other end of the hose is put on in a similar manner. The ends of the overhanging arms D D are then pounded down until they securely grip or bind the hose, as shown in Fig. 1. The longitudinal beads $b\ b$ prevent the hose from being twisted off and the screw threads $a\ a$ prevent the hose from slipping off. When no threads are formed on the shank the transverse ridges $d\ d$ are particularly useful in preventing the hose pipe $c\ c$ from slipping off the shank A but it is preferred to have these transverse ridges in all of these devices inasmuch as they act as an additional means of security even though the threads $a\ a$ are used.

It is obvious that the projections B B must be sufficiently heavy so that they will not bend when one of the arms D is pounded down, for, otherwise, the effect of pounding down one or the other of the said arms would be to elevate the opposite arm and thereby release its grip upon the hose.

Having thus described my invention, what I claim, and desire to secure by Letters Patent, is—

1. A hose mending device, consisting of a hollow cylindrical shank A, partially threaded on the outside to prevent the hose from being pulled off said shank, and having connected to said shank by means of projections B B the arms D D which are supplied on their inner side with the longitudinal beads $b\ b$ for the purpose of preventing the hose from being unscrewed when said arms D D are pounded down, substantially as described.

2. In a hose-mending device the combination of the tapering shank A with the overhanging arms D D having the longitudinal beads $b\ b$ and the transverse ridges $d\ d$ all arranged substantially as and for the purpose set forth.

ELEAZER KEMPSHALL.

Witnesses:
R. C. MITCHELL,
H. B. BROWNELL.